Jan. 28, 1941.　　C. G. H. ANDERSON ET AL　　2,230,071
MEANS OF MANUFACTURING ELECTRIC MOTORS
Filed July 26, 1937　　3 Sheets-Sheet 1

Inventors.
Carl G. H. Anderson
Judson F. Cowie.

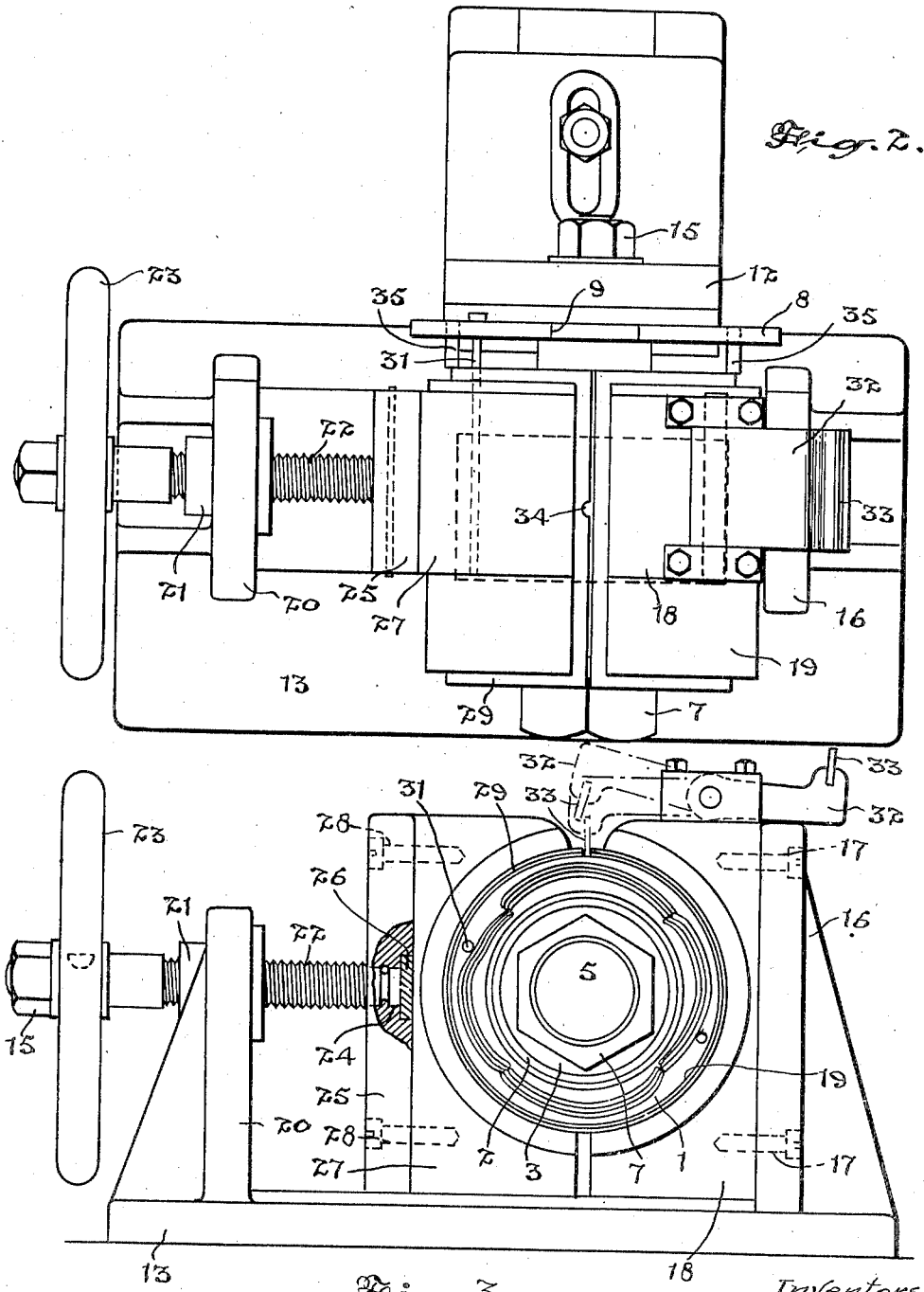

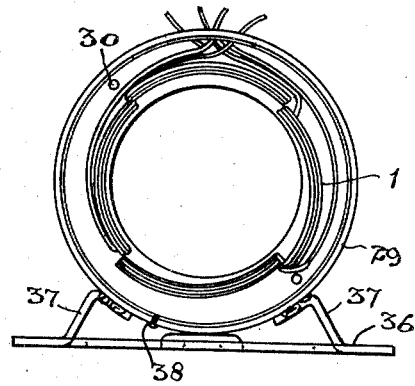
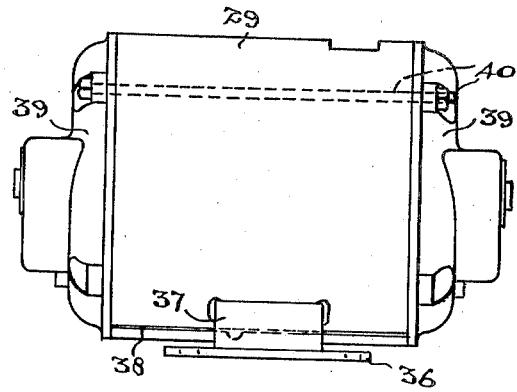
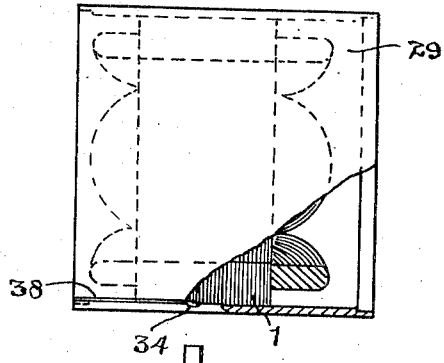
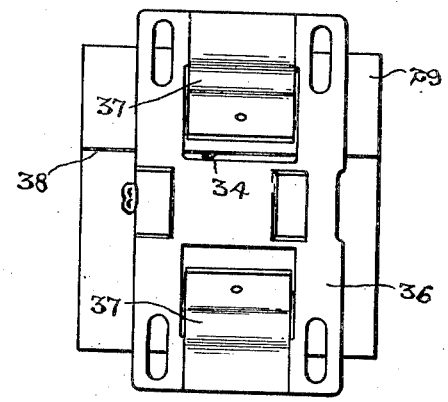
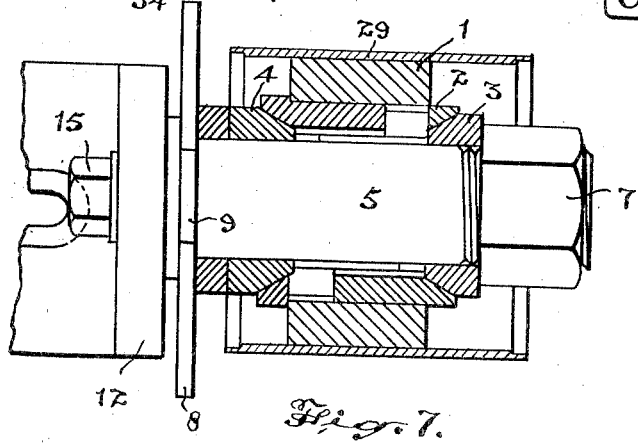

Patented Jan. 28, 1941

2,230,071

UNITED STATES PATENT OFFICE 2,230,071

MEANS OF MANUFACTURING ELECTRIC MOTORS

Carl G. H. Anderson and Judson F. Cowie, Toronto, Ontario, Canada, assignors to Wagner Electric Manufacturing Company Limited, Toronto, Ontario, Canada Application July 26, 1937, Serial No. 155,600

8 Claims. (Cl. 29—89)

The principal objects of this invention are to overcome the difficulties met with in the assembling of the field structure of the motor in the frame, ensuring accuracy in the air gap between the field and armature and obviating objectionable stresses.

A further and important object is to effect a material saving in the cost of manufacture.

A still further object is to devise a simple and inexpensive form of mechanism for holding the field structure and placing the enclosing band portion of the frame therearound in a definite relationship thereto and holding same during the welding of the band portion of the frame therearound.

The principal feature of the invention consists in first rolling a metal sheet into cylindrical form, then placing the rolled sheet loosely over the field structure which is held in a fixed position, then contracting the rolled sheet to tightly embrace the field structure, then welding or otherwise joining the edges of the sheet and securing same to the field structure.

A further and important feature consists in the novel construction of a clamp member provided with a mandrel support for holding the field and in the movable jaw structure adapted to close around the field to compress and clamp a split tube therearound and to hold the same during the securing of the tube.

In the accompanying drawings, Figure 1 is a perspective view of our improved apparatus for forming the cylindrical frame structure around a motor field.

Figure 2 is a plan view of the apparatus.

Figure 3 is a front elevational view in part section.

Figure 7 is a plan section showing the mandrel support, collets and mandrel supporting the field structure and frame sleeve shown in section.

Figure 8 is a plan detail in part section of the assembled field and sleeve.

Figure 9 is a side elevational detail of an assembled motor.

Figure 10 is an end elevation showing the motor frame and field assembled therein.

Figure 11 is an underside plan detail of the finished motor frame.

Figure 4:
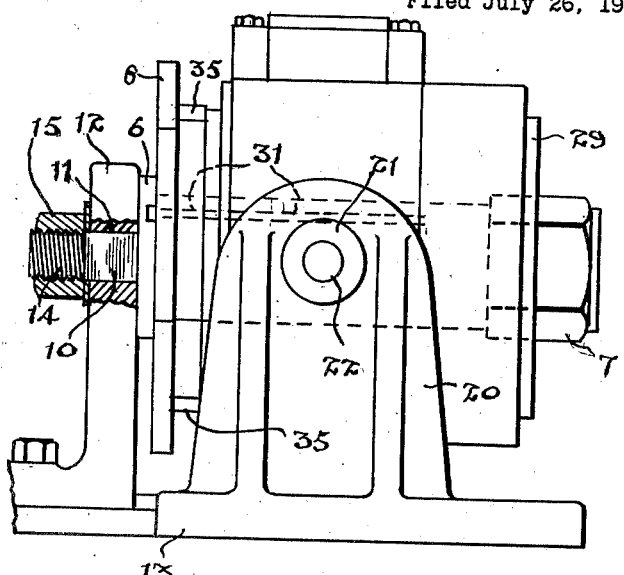
Figure 4 is an end elevation in part section taken from the left hand end of Figure 3.
Figure 5:
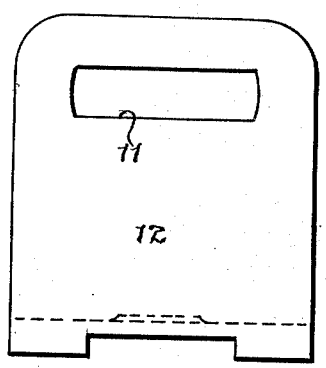
Figure 5 is an elevational detail of the mandrel-supporting bracket.
Figure 6:
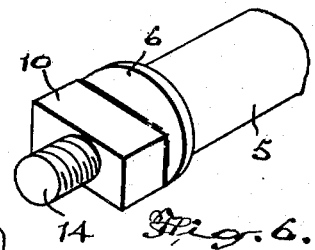
Figure 6 is a perspective detail of one end of the mandrel for supporting the field structure.
Figure 1:
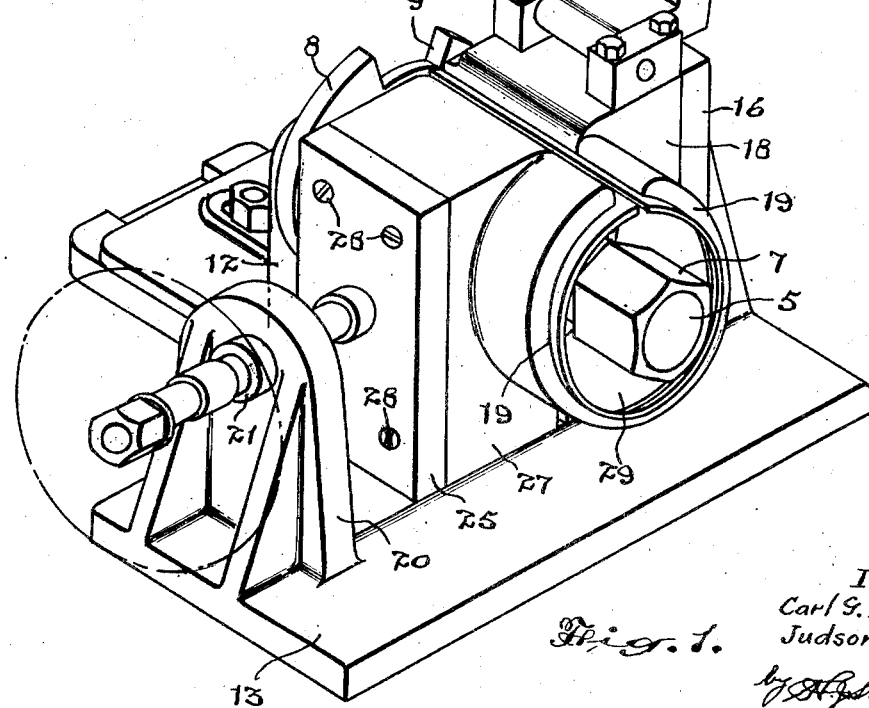

In the manufacture of small types of motors it has been the custom to first form a cylindrical shell and then press the same over the perimeter of the field structure, but due to uncontrollable variations in the external dimensions of the field and the internal dimensions of the sleeve and other variable factors, such practice creates undesirable inaccuracies and stresses, both in respect to the field and the frame sleeve and the present invention has been devised to overcome these difficulties in an entire change in the method of assembly and construction of the frame of the motor.

In carrying this invention into effect a flat metal sheet is first punched with the required openings and it is then rolled into substantially cylindrical form to bring the two end edges into close proximity. The motor field structure 1 in its completed form is placed upon an expanding mandrel 2 between the tapered collets 3 and 4 arranged upon the mandrel 5 which is provided with a flange 6 at one end and a nut 7 is threaded on the opposite end.

A plate 8 is mounted on the mandrel adjacent to the flange and this plate is provided with a notch 9 in its periphery, which is arranged upward.

The tightening of the nut 7 presses the collets 3 and 4 and expands the mandrel 2 to securely hold the field structure in a true centralized position. The end of the mandrel 5 opposite to the threaded end is formed with a flattened block portion 10 which fits in sliding engagement in a slot 11 in an angle bracket 12 which is adjustably mounted on a base plate 13. The mandrel is provided with a threaded stud 14 upon which a nut 15 is mounted to hold the mandrel securely in the bracket 12.

The base plate 13 is formed with a fixed upright bracket 16 at one end to which is rigidly secured by means of screws 17, a jaw block 18 which is formed with a semi-cylindrical face 19. A rigid bracket 20 is formed at the opposite end of the base and in it is secured an internally threaded bushing 21 in which is mounted a threaded spindle 22 having a hand wheel 23 mounted on its outer end. The inward end of the spindle 22 is inserted into a bearing orifice 24 in a plate 25 which is provided with a hardened end thrust plate 26.

A jaw block 27 similar to the block 18 is secured to the plate 25 by the screws 28. The part cylindrical jaw blocks 18 and 27 are shaped to snugly embrace the cylindrical frame shell 29 when it is closed snugly around the periphery of the field 1. The field 1 is provided with a longitudinal positioning hole 30 which receives a pin 31 secured to the plate 8 and extending horizontally therefrom. The field is thus held in a definite position on the mandrel. The split frame shell 29 is inserted over the mandrel between the jaw blocks 18 and 27. A positioning arm or gauge 32 is hinged on the jaw block 18 and provided with a plate edge 33, which when the arm is swung downwardly engages the edge of the slotted frame shell adjacent to the block 18, thus enabling the accurate circumferential positioning of the shell in relation to the field. Pressure is then applied to the movable jaw block 27 by operating the spindle 22 which in cooperation with the mating jaw block 18 constricts the slotted frame shell tightly into peripheral surface contact with the field structure.

While the frame shell is thus held in tight embracing contact with the field structure, the closely adjacent edges of the frame shell are suitably welded, fused, brazed or otherwise secured together and one of the edges of the frame shell having been formed with a notch 34 enables a direct weld to take place between the shell and the closely underlying field, so that the shell is not only welded together in embracing contact with the field, but the field is actually welded to the shell and there can be no possible shifting.

In placing the frame shell in position between the clamping jaws the axial position of the shell in relation to the field is definitely determined by a plurality of studs 35 secured in the plate 8 in position to abut the end of the shell. These studs can be changed to enable the proper assembly of various sizes of motor frames, so also the jaw blocks may be changed to suit different diameters of fields.

It will be particularly noted that when the frame shell has been properly located with the edge of the shell positioned by the positioning arm 32, said arm may be thrown back out of the way so as to permit the welding operation on the joint. The notch 9 is provided in the plate 8 so that the welding tool may operate freely thereover.

Prior to the welding operation it is found desirable to insert asbestos or other shields between the wires of the field structure and the extending shell ends so as to protect the wires from the welding heat.

When the frame shell has thus been clamped around the field structure and permanently secured thereto by welding the mandrel is loosened and the assembled structure is withdrawn.

The pressed metal base 36 may then be applied to the shell, said base having stamped up lugs 37 which are suitably welded to the shell, the welded seam 38 of the shell being properly spaced in relation thereto prior to the welding operation. This spot welding of the base to the field shell will have no detrimental effect upon the shell and no stresses will be applied such as do occur where a base has been secured to a shell before the shell is placed upon the field structure, that is to say, when the cylindrical field structure has the frame shell clamped snugly therearound and welded in place, the application of heat at any particular point for spot welding will not be capable of warping or applying any detrimental stresses to the shell and field.

The adjustable arrangement of the mandrel 5 in the slot 11 of the angle bracket 12 permits slight variation in the position of the mandrel in the clamping of the shell plate in position and it also permits adjustment of the mandrel centre for various sizes of motor frames.

It will be understood that in positioning the field upon the mandrel and the outer shell upon the field, registration of the hole 30 with the pin 31 and engagement of the shell with the studs 35 with the joint edges in register with the gauge arm blade 33 will ensure a certain definite axial and circumferential relationship between the field and the outer split shell applied thereover to determine the point of welded connection thereof. Thus when the base is assembled in a definite relation to the welded joint the end caps and armature bearing supports 39 may be assembled in their proper relationship to the frame and base because the positioning hole 30 and other relatively spaced holes extending through the field structure receive the fastening bolts 40 which extend through the end cap 39 and the field.

A method of assembly such as described with an apparatus as herein set forth enables the very accurate manufacture of the small types of motors and such manufacture is executed at the minimum of expense through the elimination of a number of operations which are otherwise necessary.

What we claim as our invention is:

1. An apparatus for assembling an electric motor field structure and shell of greater axial length than the field structure comprising a base having a pair of rigid upright lugs, a jaw block secured to one lug, a screw spindle threaded in the opposite lug, a jaw block mounted on said screw spindle, a bracket adjustable on said base, a mandrel mounted on said adjustable bracket, means for positioning the field structure on said mandrel, gauge means for accurately peripherally positioning the sleeve on said field structure, and means separate from said gauge means for axially positioning said shell with its ends overhanging said field structure.

2. Apparatus expressly for effecting the accurate assembly of a longitudinally split cylindrical frame shell on an electric motor field in telescoped relation comprising in combination, a support, means for rigidly mounting the field structure and locking same in predetermined peripherally and axially adjusted relation on said support including a mandrel for insertion in said field structure, stop members carried by said support for engagement with the end edge of the shell to axially position the same relative to said rigidly supported field structure, a positioning member adapted to be inserted between the spaced edges of the sleeve to accurately position said spaced edges in predetermined relation to the support and field structure, and means for peripherally constricting said split sleeve tightly about said field structure with the edges of the split exposed to permit the fusing of said edges together and/or to the field structure, said latter means including vise-like clamping members formed to closely embrace the sleeve and at least one of which is slidably mounted on said support for displacement parallel to the other.

3. Means as claimed in claim 2, in which said means for peripherally constricting said split shell comprises clamping jaws one of which is rigidly secured to said support, and said mandrel is adjustably mounted on said support for displacement at least toward and from said rigidly mounted jaw in a direction parallel to the direction of displacement of said slidably mounted clamping member to bring the frame shell into various parallelly spaced co-operative relationship with the fixed jaw and thereby to provide for the assembly of motors of various sizes.

4. Means as claimed in claim 2 in which said support includes, a main base having an upright support mounted thereon for adjustment in a plane right angular to the plane of displacement of said clamping member, said mandrel being mounted on said upright support for adjustment in a plane right angularly intersecting the plane of displacement of the support whereby the relative position of said mandrel to the main base may be altered in said respective planes to suit the requirement of various sizes of motors.

5. Means as claimed in claim 2 in which said mandrel carries expansible portions over which the field structure is adapted to be slipped, and means for expanding said portions including a nut member threaded on the mandrel and over which the field structure is adapted to be slipped.

6. Means as claimed in claim 2 in which said stop members for axially positioning the split outer shell comprises studs interchangeably associated with the support for co-operation with shells of different sizes.

7. A device as claimed in claim 2 in which a plate is mounted on said mandrel said stop members comprising positioning studs removably mounted on said plate to engage the frame shell in axial positioning contact, a positioning stud being inserted in said plate adapted to engage a hole in the field structure to effect the positive non-rotative locking of said field structure in its peripherally adjusted position.

8. A device as claimed in claim 2 in which the means for peripherally positioning said split shell on the supported field structure comprises, a guide arm pivotally mounted on said support and having a blade-like portion adapted to pass between the said clamping members and enter the split between the spaced edges of the frame shell, said arm being movable to an unobstructed position to clear the blade from the slot and permit welding of the edges of said shell to each other and to the underlying field structure.

CARL G. H. ANDERSON.
JUDSON F. COWIE.